United States Patent
Thorson et al.

(10) Patent No.: US 8,517,715 B2
(45) Date of Patent: Aug. 27, 2013

(54) PEX EXPANDING TOOL

(75) Inventors: Troy C. Thorson, Waukesha, WI (US); Andrew J. Weber, Cudahy, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 223 days.

(21) Appl. No.: 13/081,163

(22) Filed: Apr. 6, 2011

(65) Prior Publication Data
US 2011/0239425 A1    Oct. 6, 2011

Related U.S. Application Data

(60) Provisional application No. 61/321,404, filed on Apr. 6, 2010.

(51) Int. Cl.
*B29C 57/04* (2006.01)

(52) U.S. Cl.
USPC ............. 425/392; 425/393; 425/467; 72/392; 72/393; 72/482.1

(58) Field of Classification Search
USPC .......... 425/392, 393, 467, DIG. 218; 72/392, 72/39, 482.1, 393; 29/237, 268, 280, 282, 29/317
See application file for complete search history.

(56) References Cited

U.S. PATENT DOCUMENTS

| | | | |
|---|---|---|---|
| 2,999,529 A | 11/1958 | Rast | |
| 3,550,424 A | 12/1970 | Rast | |
| 3,888,102 A * | 6/1975 | Nigido | ............................. 72/393 |
| 3,940,227 A | 2/1976 | Strasser | |
| 4,034,591 A | 7/1977 | Rothenberger | |
| 4,107,249 A * | 8/1978 | Murai et al. | .................. 425/393 |
| 4,144,735 A | 3/1979 | Rothenberger | |

(Continued)

FOREIGN PATENT DOCUMENTS

| | | |
|---|---|---|
| DE | 19924695 | 11/2000 |
| DE | 19963885 | 5/2001 |

(Continued)

OTHER PUBLICATIONS

European Search Report for European Appl. No. 11250435.2-2307 dated Aug. 3, 2011, 6 pages.

*Primary Examiner* — David B Jones
(74) *Attorney, Agent, or Firm* — Michael Best & Friedrich LLP

(57) ABSTRACT

A tool operable to expand an end of a pipe includes a plurality of jaws movable between a closed position and an expanded position and rotatable about a longitudinal axis and a rotation collar rotationally coupled to each of the plurality of jaws. A shuttle is selectively engageable with the rotation collar and is rotatable between a first orientation and a second orientation and a spindle is movable between a first position in which the shuttle is in the first orientation and is disengaged from the rotation collar, a second position in which the shuttle is in the first orientation and is engaged with the rotation collar, and a third position in which the shuttle and the rotation collar are rotated together to the second orientation. The rotation of the rotation collar produces a corresponding rotation of the plurality of jaws while the plurality of jaws is in the closed position. Movement of the spindle to a fourth position moves the plurality of jaws to the expanded position and maintains the engagement of the shuttle and the rotation collar in the second orientation.

23 Claims, 10 Drawing Sheets

(56) References Cited

U.S. PATENT DOCUMENTS

| | | |
|---|---|---|
| 4,154,083 A | 5/1979 | Rothenberger |
| 4,425,783 A | 1/1984 | Rast |
| 4,735,078 A | 4/1988 | Wesebaum |
| 4,890,472 A | 1/1990 | Rothenberger |
| 5,046,349 A | 9/1991 | Velte |
| 5,090,230 A | 2/1992 | Koskinen |
| 5,243,845 A | 9/1993 | Velte |
| 5,744,085 A | 4/1998 | Sorberg |
| 6,862,766 B2 | 3/2005 | Geurts |
| 7,065,995 B2 | 6/2006 | Frenken |
| 7,128,560 B2 * | 10/2006 | Tandart .................. 425/392 |
| 7,325,436 B2 | 2/2008 | Cheng |
| 7,922,475 B2 * | 4/2011 | Gueit ..................... 425/393 |
| 2006/0201228 A1 | 9/2006 | Rothenberger |
| 2007/0057393 A1 | 3/2007 | Hartmann et al. |
| 2008/0160130 A1 | 7/2008 | Gueit |

FOREIGN PATENT DOCUMENTS

| | | |
|---|---|---|
| DE | 202008002266 | 4/2008 |
| EP | 0397570 | 11/1990 |
| EP | 0462719 | 12/1991 |
| EP | 0567742 | 11/1993 |
| EP | 0718057 | 6/1996 |
| EP | 0878287 | 7/2001 |
| EP | 1118401 | 7/2001 |
| EP | 2090384 | 8/2009 |
| EP | 2090385 | 8/2009 |
| FR | 2645052 | 10/1990 |
| GB | 1485098 | 9/1977 |
| GB | 1524149 | 9/1978 |
| JP | 7185676 | 7/1995 |
| WO | 8800503 | 1/1988 |
| WO | 0189736 | 11/2001 |
| WO | 2009000966 | 12/2008 |

* cited by examiner

PEX EXPANDING TOOL

CROSS-REFERENCE TO RELATED APPLICATIONS

This application claims priority under 35 U.S.C. §119(e) to U.S. Provisional Patent Application No. 61/321,404 filed on Apr. 6, 2010. The content of the application is hereby incorporated by reference in its entirety.

BACKGROUND

The present invention relates to pipe and tubing expansion tools and methods. More particularly, the present invention relates to PEX (cross-linked polyethylene) expansion tools that utilize a multi-segment expansion head, and an auto-rotation feature.

Polymer tubing is gaining popularity in residential home and commercial building construction due to the rising cost of copper pipe. One of the more common types of polymer tubing is made from cross-linked polyethylene, commonly known as PEX. Polymer tubing is connected to a joint by expanding the mouth of the tubing, thus allowing the tubing to slip over the joint. The tubing is then secured to the joint by crimping the expanded part of the tubing. A typical building will have many joints; hence installation of the tubing involves expanding the mouths of numerous tubes.

SUMMARY

In one embodiment the invention provides a tool operable to expand an end of a pipe. The tool includes a plurality of jaws movable between a closed position and an expanded position and rotatable about a longitudinal axis and a rotation collar rotationally coupled to each of the plurality of jaws. A shuttle is selectively engageable with the rotation collar and is rotatable between a first orientation and a second orientation and a spindle is movable between a first position in which the shuttle is in the first orientation and is disengaged from the rotation collar, a second position in which the shuttle is in the first orientation and is engaged with the rotation collar, and a third position in which the shuttle and the rotation collar are rotated together to the second orientation. The rotation of the rotation collar produces a corresponding rotation of the plurality of jaws while the plurality of jaws is in the closed position. Movement of the spindle to a fourth position moves the plurality of jaws to the expanded position and maintains the engagement of the shuttle and the rotation collar in the second orientation.

In another embodiment the invention provides a tool operable to expand an end of a pipe. The tool includes a plurality of jaws movable between a closed position and an expanded position and rotatable about a longitudinal axis and a shuttle that is selectively engageable with the plurality of jaws and rotatable between a first orientation and a second orientation. A spindle is selectively coupled to the shuttle such that the spindle and the shuttle move between a first position and a second position in unison. The shuttle is in the first orientation and is disengaged from the plurality of jaws when the spindle is in the first position and the shuttle is in the first orientation and is engaged with the plurality of jaws when the spindle is in the second position. Further movement of the spindle from the second position toward a third position in which the spindle engages the plurality of jaws to move the jaws to an expanded position produces rotation of the shuttle to the second orientation. A sleeve is coupled to the shuttle and includes a cam surface. The cam surface is engagable with the shuttle as the spindle moves from the second position to the first position to rotate the shuttle to the first orientation.

In yet another embodiment the invention provides a method of rotating a plurality of jaws, the plurality of jaws being movable between a closed position and an expanded position. The method includes positioning a spindle in a first position wherein the spindle is spaced apart from the plurality of jaws and the plurality of jaws are in the closed position, coupling a shuttle to the spindle, the shuttle movable between a first orientation and a second orientation, and moving the spindle and the shuttle in unison along a longitudinal axis to a second position. The method also includes coupling the shuttle and the plurality of jaws when the spindle is in the second position, moving the spindle to a third position in which the spindle is spaced apart from the plurality of jaws and the plurality of jaws are in the closed position, and rotating the spindle and the plurality of jaws to the second orientation in response to movement of the spindle from the second position to the third position. The method further includes moving the spindle to a fourth position while maintaining the spindle and the plurality of jaws in the second orientation, moving the jaws to the expanded position in response to movement of the spindle to the fourth position, and returning the spindle to the first position from the fourth position. The method also includes disengaging the shuttle and the plurality of jaws as the spindle moves from the second position toward the first position, engaging the shuttle and a cam surface after the shuttle disengages from the plurality of jaws, and rotating the shuttle from the second orientation to the first orientation in response to the cooperation of movement of the spindle to the first position and the engagement of the shuttle and the cam surface.

Other aspects of the invention will become apparent by consideration of the detailed description and accompanying drawings.

DETAILED DESCRIPTION

Figure 1:
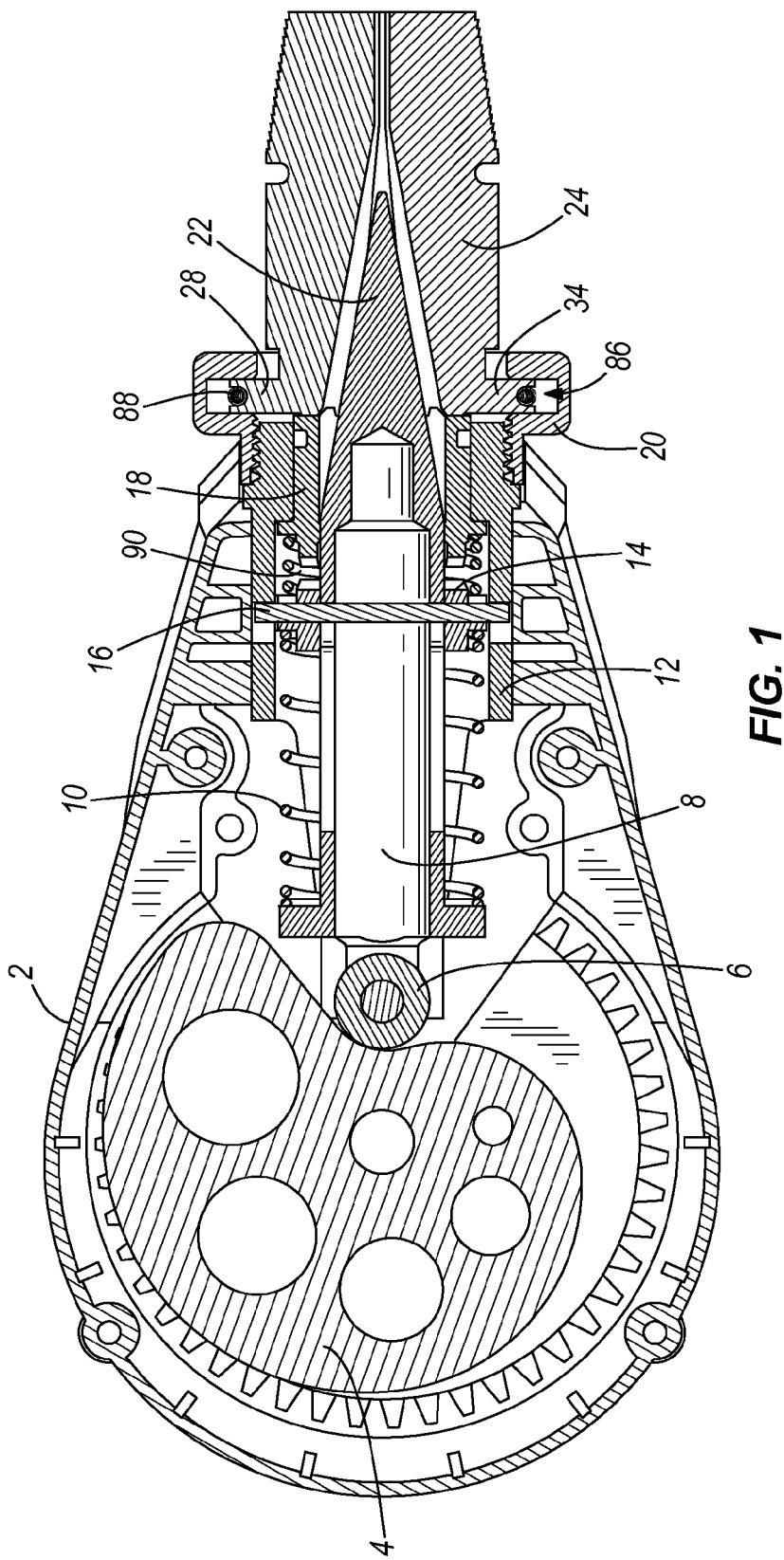
FIG. 1 is a cutaway top view an expanding tool.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Referring now to the drawings, an expanding tool 3 includes a housing 2, and disposed inside the housing 2 a cam 4 which is rotatably attached to the housing 2. A buffer 6 is disposed inside the housing 2 and is in contact with the cam 4, such that as the cam 4 rotates the buffer 6 moves inside the housing 2. A spindle 8 is disposed inside the housing 2 and is in contact with the buffer 6, such that the spindle 8 moves in conjunction with the buffer 6. A spring 10 is disposed on the exterior of the spindle 8 and is in contact with the spindle 8. The spindle 8 is partially disposed within a sleeve 12 that has a first end and a second end. The sleeve 12 is partially disposed within and connected to the housing 2. The spindle 8 includes a portion disposed in the interior of a shuttle 14, and a pin 16 connects the sleeve 12, the shuttle 14, and the spindle 8. In one embodiment, a rotation collar 18, having a first end and a second end, is disposed on the exterior of the spindle 8, and the rotation collar 18 is able to engage the shuttle 14. A cap 20 is disposed on the second end of the sleeve 12. A wedge 22 is connected to the spindle 8. A plurality of jaws 24 are connected to the cap 20 and engage with the rotation collar 18 and the wedge 22.

Figure 2:
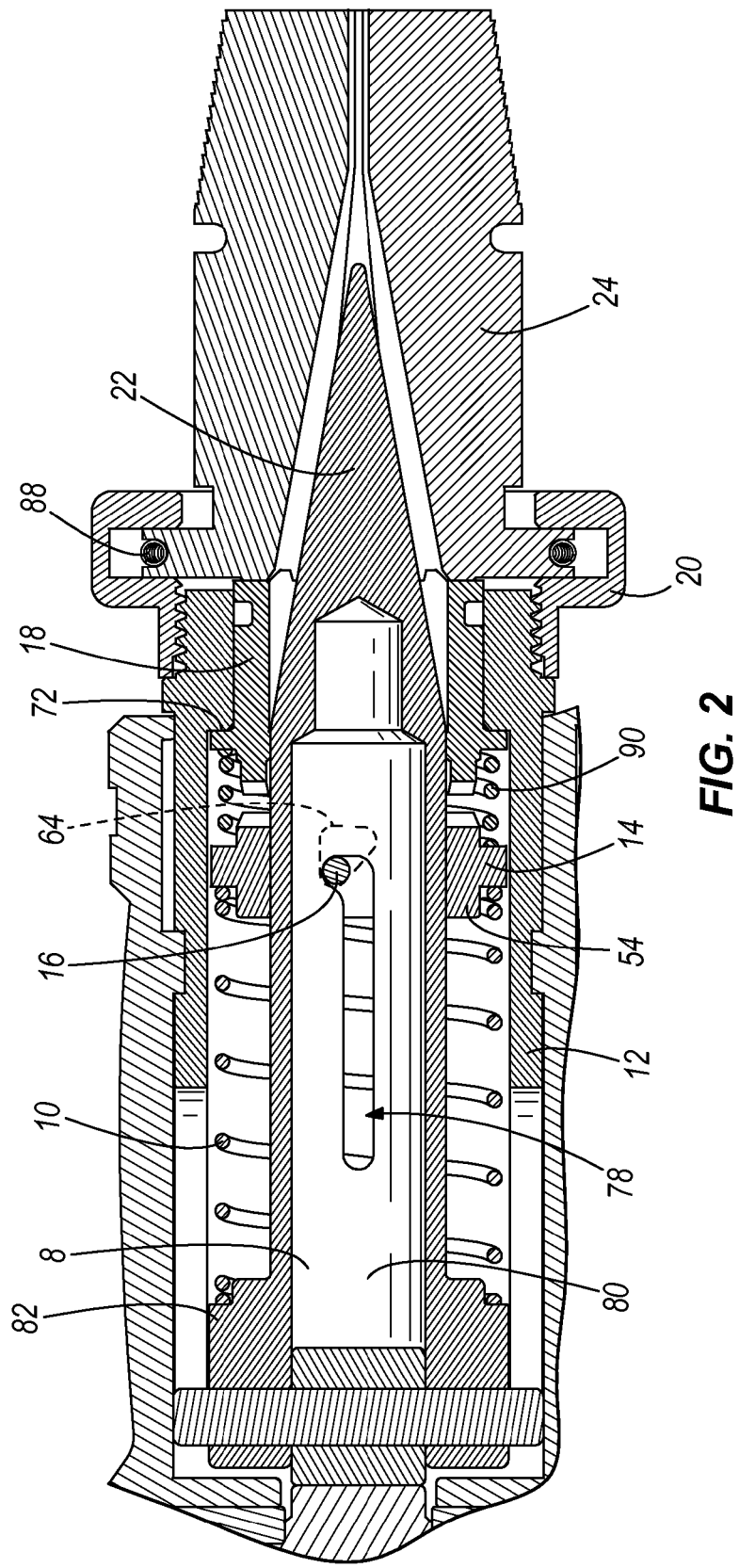
FIG. 2 is a top view of the spindle portion and jaws of the tool of FIG. 1, showing the tool in a home position.

FIGS. 1 and 2 show the expanding tool in a home position, that is, the position the tool remains in when it is not being operated. In one embodiment, the cam 4 is connected to an electric motor (not shown) that is selectively operable by a user. In another embodiment the operator rotates the cam 4 via a lever (not shown) and gears (not shown). The cam 4 is connected to the housing 2 such that the cam 4 is able to rotate about an axis.

Figure 5:
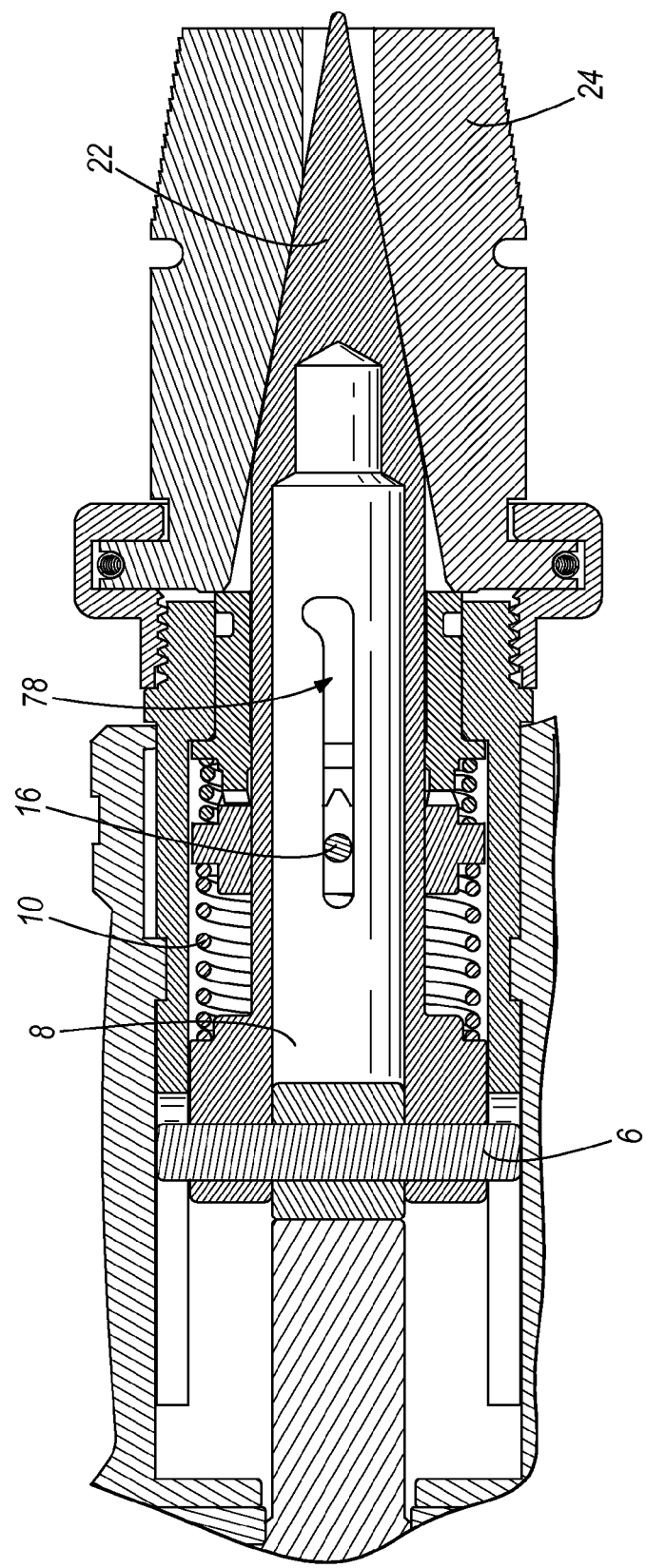
FIG. 5 is a top view of the spindle portion and jaws of the tool of FIG. 1, showing the spindle portion in a fourth position with the jaws in a partially expanded state.
Figure 6:
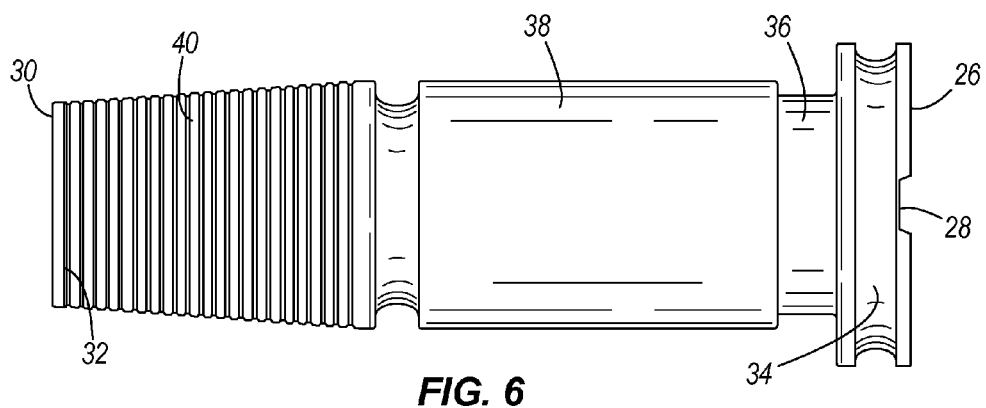
FIG. 6 is a top view of a plurality of jaws.

As illustrated in FIG. 6, a first end of one of the jaws 24 includes an interface portion 26 including a slot 28 adapted to engage the rotation collar 18 as will be discussed with regard to FIGS. 2-5. A second end of the jaw includes a frustoconical end 30 that extends from a small diameter cylindrical portion 32. A collar portion 34 is disposed adjacent the first end of the jaw 24. The collar 34 includes a large diameter portion 36. In the illustrated construction, a plurality of ribs 40 is formed in the frustoconical end 30. However, other constructions may omit the ribs 40. In the illustrated construction, two or more jaws 24 are used to define a complete 360 degree jaw section that fits within a tube to be expanded. Of course, other constructions could employ three or more jaws 24 to complete the jaw section of the tool.

Figure 7:
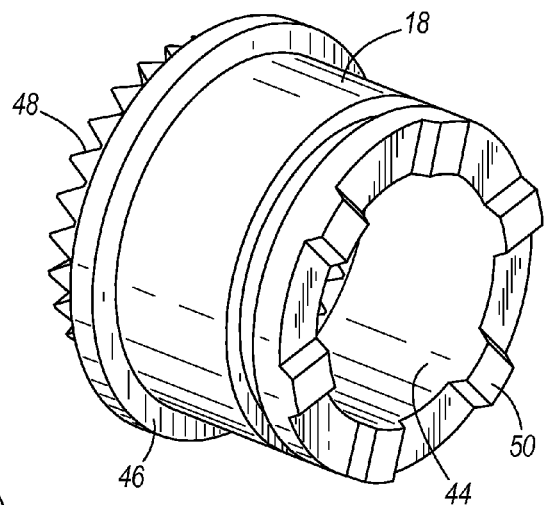
FIG. 7 is a perspective view of a rotation collar.

The rotation collar 18, illustrated in FIG. 7 includes a substantially hollow cylindrical body 44 that includes a first end having a radially extending boss 46 and a series of teeth 48 extending axially. In another embodiment the teeth 48 are shaped to allow the shuttle 14 to slip with respect to the rotation collar 18 when a certain opposing force is present on the rotation collar 18. A second end of the rotation collar 18 has a series of extensions 50 sized and shaped to engage the slots 28 of the interface portion 26 of the jaws 24. The extensions 50 extend axially in a direction opposite the teeth 48 on the first end. The extensions 50 extend in an axial direction and are configured such that each extension 50 engages one of the jaws 24 such that the rotation collar 18 and the jaws 24 are coupled for rotation about a central axis but are free to move separately along that axis if required. The shape and number of the extensions 50 is a function of the number of jaws 24 and the shape or arrangement of the interface portion 26 of the jaws 24. Thus, other configurations of the extensions as well as the interface portion 26 are possible and are contemplated.

Figure 8:
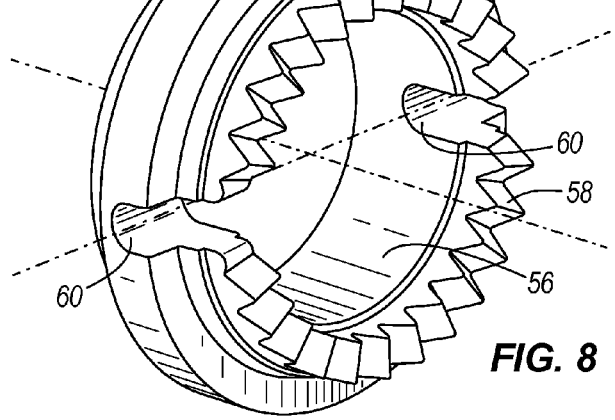
FIG. 8 is a perspective view of a spindle collar.

The shuttle 14, shown in FIG. 8 includes a shoulder 54 (shown in FIG. 2) positioned at the inner most diameter on a first end. The shuttle includes a hollow cylindrical body 56 having a series of teeth 58 extending in a second axial direction. In another embodiment the teeth 58 are shaped to allow the shuttle 14 to slip with respect to the rotation collar 18 when a certain opposing force is present on the rotation collar 18. The teeth 58 are arranged to substantially match and engage the teeth 48 of the rotation collar 18 to couple the rotation collar 18 and the shuttle 14 for rotation as will be discussed with regard to FIGS. 2-5. A pair of apertures 60 are formed along a diameter of the shuttle 14 such that the central axis of the apertures intersects and is normal to the axis of the tool. As will be discussed in greater detail with regard to FIGS. 2-5 the shoulder 54 operates to guide a spring 10 and maintain the spring 10 in a desired operating position.

Figure 9:
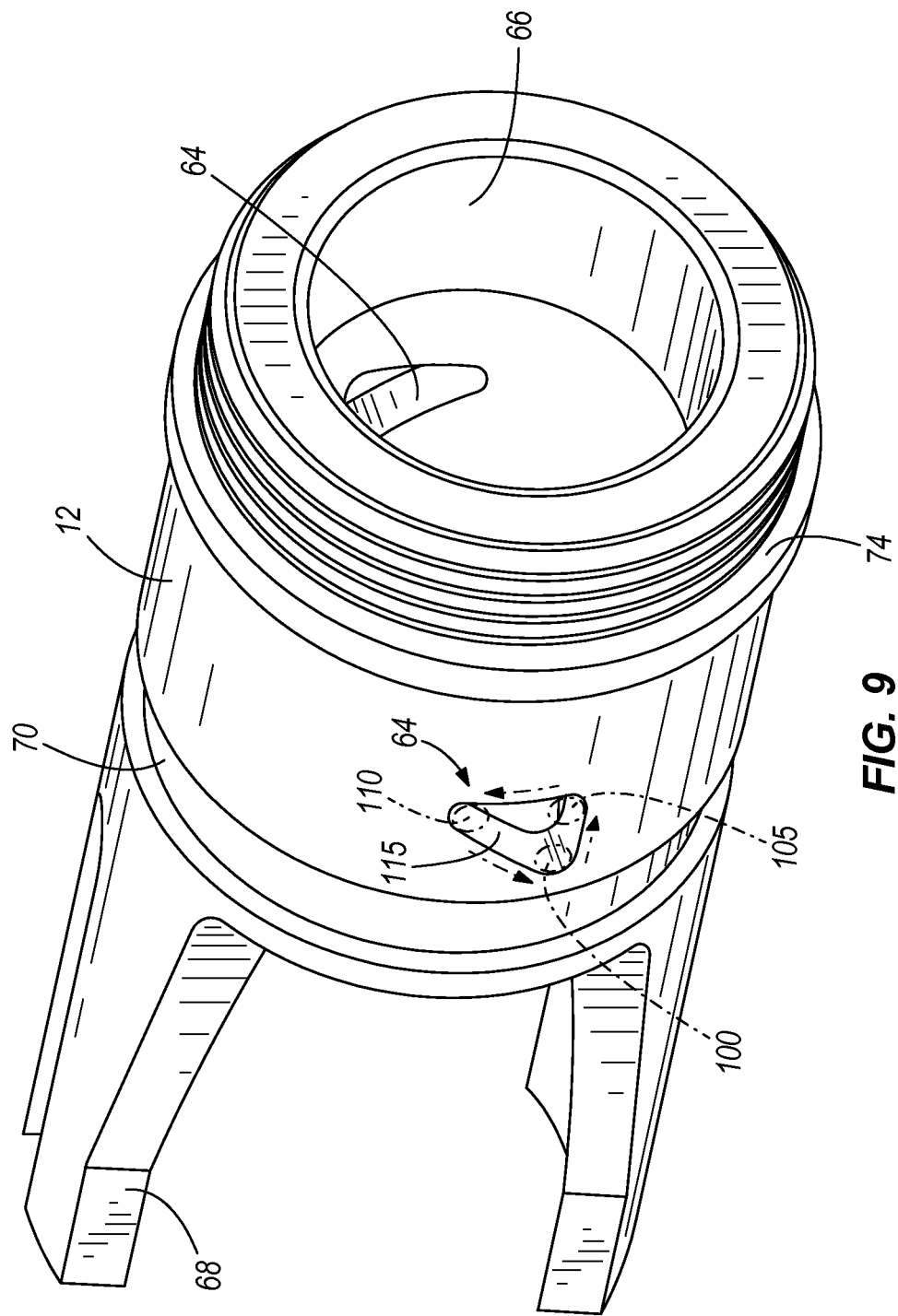
FIG. 9 is a perspective view of a sleeve.
Figure 10:
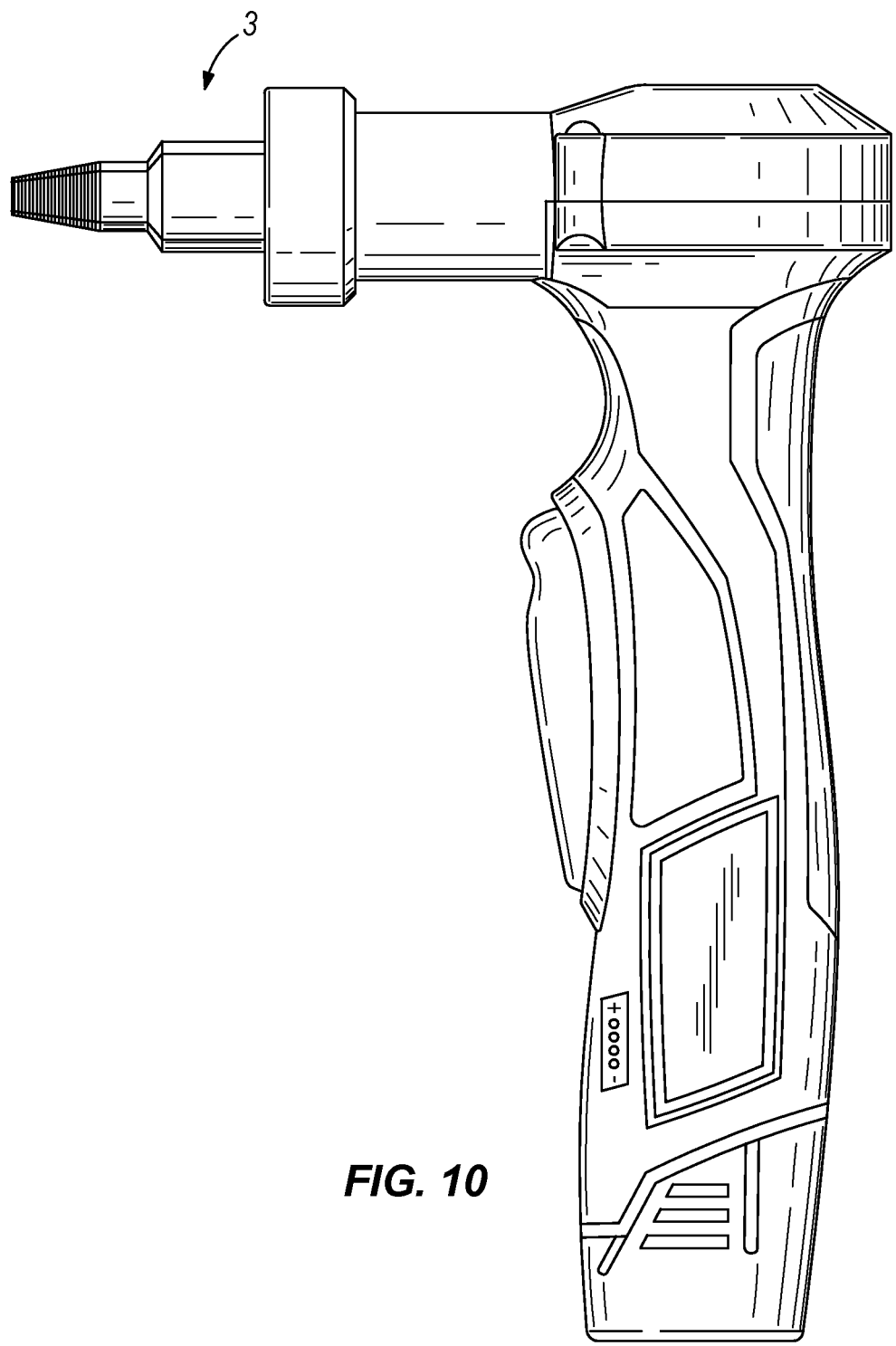
FIG. 10 is a perspective view of a hand tool including the expanding tool of FIG. 1.
Figure 11:
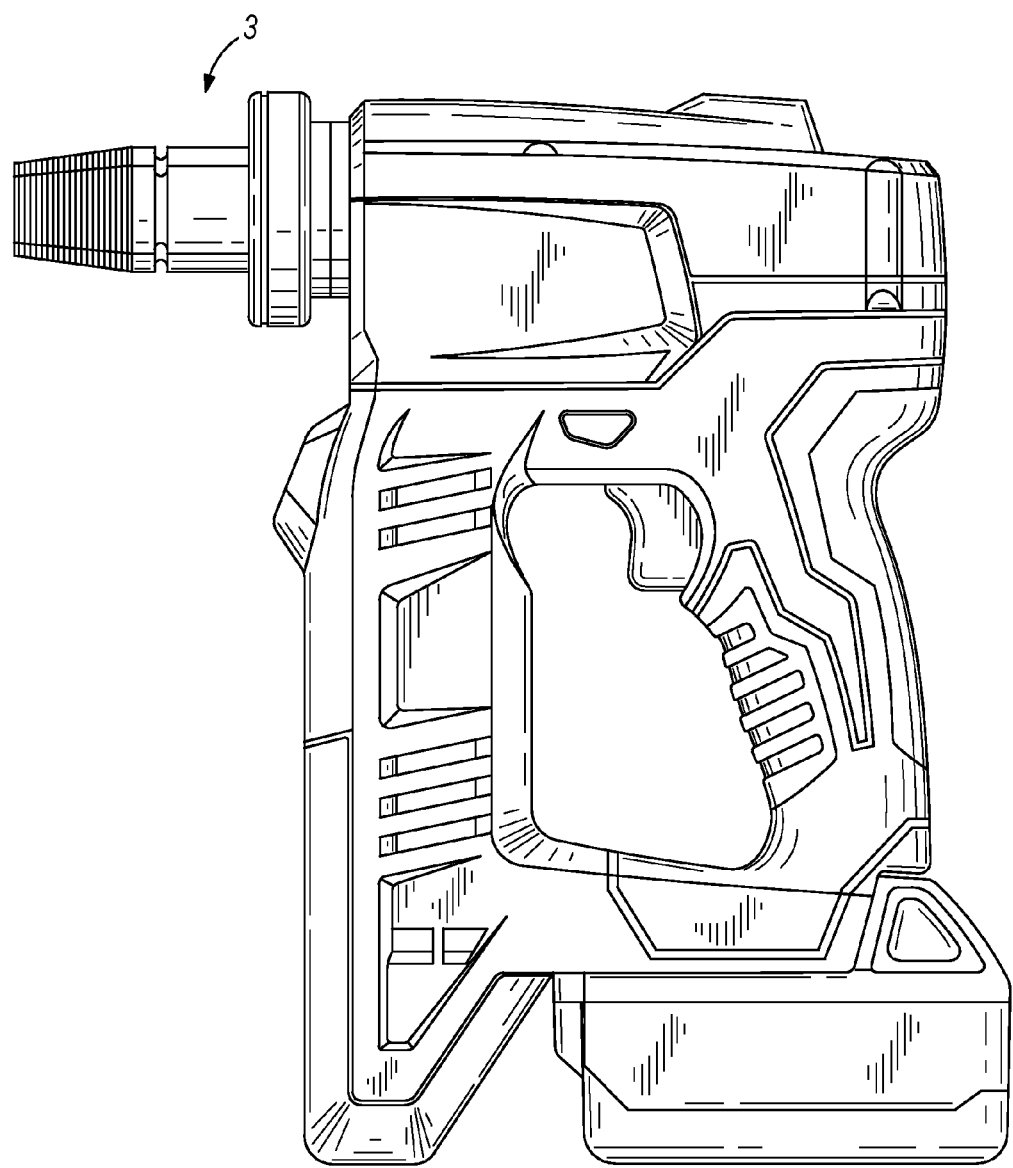
FIG. 11 is a side view of another hand tool including the expanding tool of FIG. 1.
Figure 12:
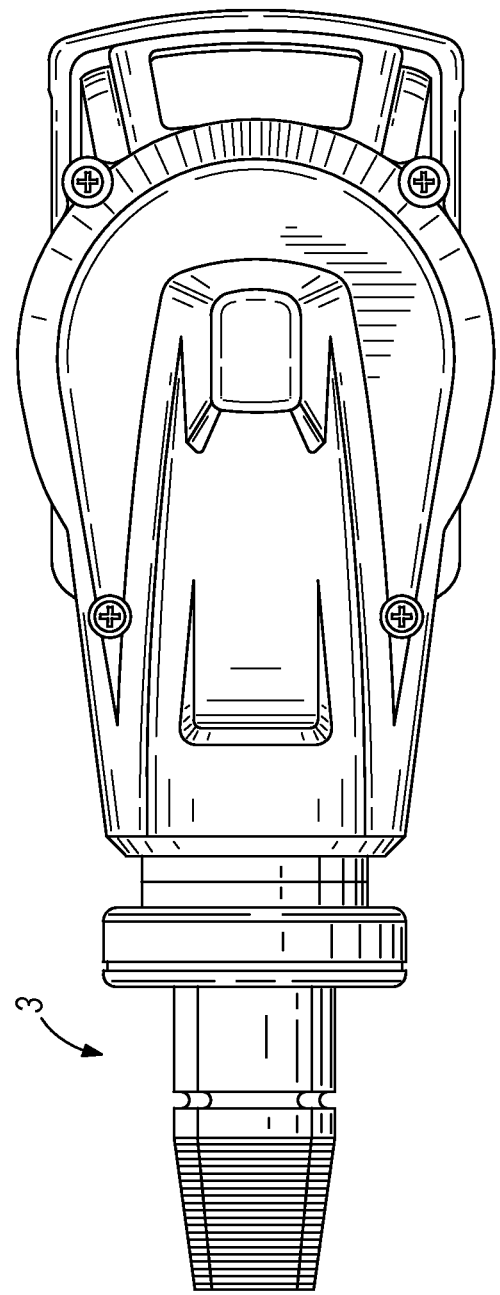
FIG. 12 is a top view of the hand tool and the expanding tool of FIG. 11.

The sleeve 12, shown in FIG. 9 includes a pair of triangular shaped recesses 64. The sleeve 12 includes a hollow cylindrical body 66 sized to substantially match and engage the interior of the housing 2. A first end of the sleeve 12 includes a plurality of projections 68 having space therebetween and a shoulder 70 positioned on the exterior of the sleeve 12. A second end of the sleeve includes a shoulder 72 disposed on the interior of the sleeve (as seen in FIG. 2). Threads 74 are disposed on the exterior of the second end of the sleeve.

As can be seen in FIG. 2, the spindle 8 is substantially cylindrical and is hollow. A pair of L-shaped apertures 78 are formed by the cylindrical wall 80 of the spindle 8. A long portion of the L-shaped aperture 78 extends along an axis that is substantially parallel to the center axis of the spindle 8. A flange 82 is disposed on a first end of the spindle 8. The flange 82 receives and guides the spring 10 to maintain the spring 10 in a desired operating position.

The wedge 22 attaches to the spindle 8 and is disposed within a space defined by the jaws 24. The second end of the wedge 22 has a shape which is designed to substantially match and engage the interior of the jaws 24.

The spring 10 provides a force which keeps the spindle in contact with the buffer 6, and the buffer 6 in contact with the cam 4. In the home position the shuttle 14 and rotation collar 18 are separated.

With reference to FIG. 1, the jaws 24 are arranged to extend 360 degrees around when in the home position. Thus, the collar portion 34 cooperates to define a complete disk-shaped collar that fits within a recess 86 formed as part of the cap 20. The recess 86 restrains axial movement of the jaws 24 while allowing substantially free radial movement of the jaws 24. A biasing member 88, such as a spring, is positioned within the recess 86 and biases the jaws 24 in a closed position when the jaws 24 are not being expanded by the wedge 22.

The sleeve 12 is substantially disposed in the interior of the housing 2. The second end of the sleeve 12 is partially disposed outside of the housing 2 and the cap 20 attaches to the second end of the sleeve 12. The rotation collar 18 is positioned adjacent the second end of the jaws 24 such that the extensions 50 can engage the slots 28 of the interface portion 26 of the jaws 24. The extensions 50 positively engage the slots 28 of the interface portion 26 of the jaws 24. Thus the extensions 50 and the slots 28 of the interface portion 26 of the jaws 24 can be coupled together to ensure that the jaws 24 rotate when the rotation collar 18 rotates. The rotation collar 18 is supported for free rotation about the axis of the tool and is free to move axially if required until the boss 46 of the rotation collar 18 contacts the shoulder 72 of the sleeve 12.

A spring 90 may be disposed between the rotation collar 18 and the shuttle 14 in order to bias the rotation collar 18 and the shuttle 14 apart. The spring 90, if employed provides less resistance to an axial force than the spring 10, such that when the spring 10 is being compressed by the spindle 8 the spring 90 compresses before the spring 10 compresses. The spindle 8 is partially disposed on the interior of the rotation collar 18 and shuttle 14 and is free to move axially. The pin 16 is disposed in the L-shaped aperture 78 of the spindle 8, the holes of the shuttle 60, and the triangular recesses 64 of the sleeve 12 thus connecting the spindle 8, shuttle 14 and sleeve 12.

Figure 3:
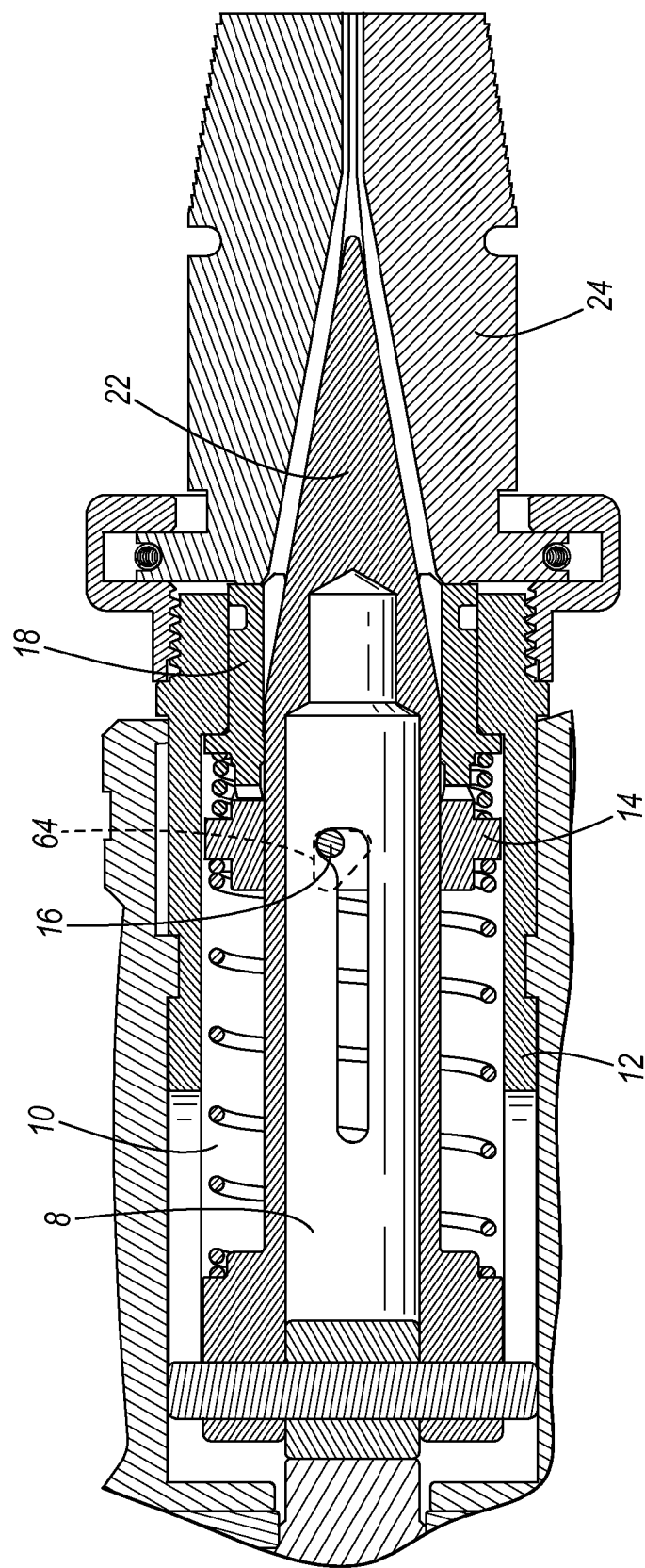
FIG. 3 is a top view of the spindle portion and jaws of the tool of FIG. 1, showing the spindle portion in a second position.

FIG. 3 shows the spindle 8 during one point of its movement towards the jaws 24. The cam 4 (not shown) is partially rotated, thus pushing the buffer 6 and the spindle 8 towards the jaws 24. The spring 10 is in contact with a base of the spindle 8 and the shuttle 14. As the spindle 8 moves towards the jaws 22, the spring 10 is moved towards the jaws, thus causing the shuttle 14 to engage with the rotation collar 18. The pin 16 is able to move with the spindle 8 for a set distance, due to the triangular recesses 64 of the sleeve 12. At this point of the cam's 4 movement, the jaws 24 have not begun to expand.

Figure 4:
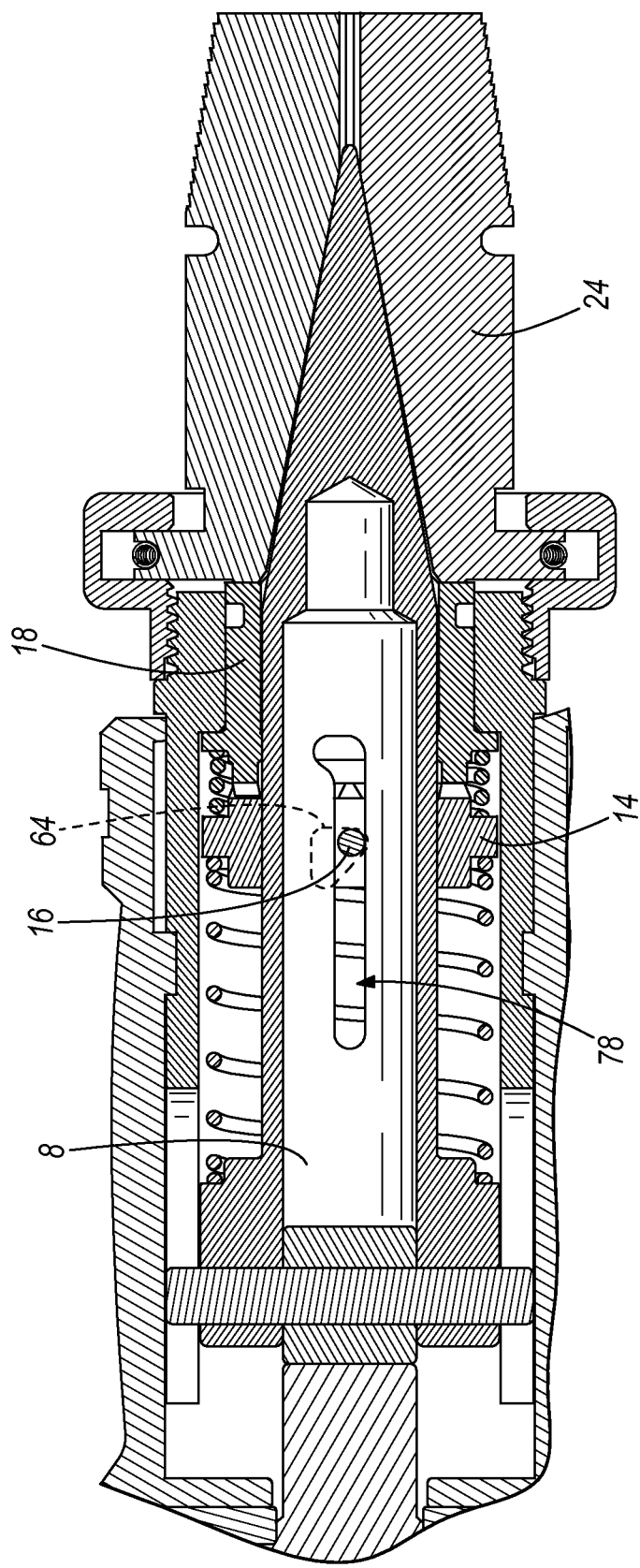
FIG. 4 is a top view of the spindle portion and jaws of the tool of FIG. 1, showing the spindle portion in a third position.

FIG. 4 shows the spindle 8 during a further point of its movements towards the jaws 24. When the shuttle 14 is engaged with the rotation collar 18, the shuttle 14 is unable to move towards the jaws 24. At this point, the force on the spindle causes the pin 16 to move within the triangular shaped recesses 64. The triangular shaped recesses 64 are positioned such that as the spindle 8 applies a force towards the jaws 24 on the pin 16, the pin 16 moves along a side of the triangular recesses 64 that is at an angle to the center axis of the spindle 8. The movement of the pin 16 in the triangular shaped recesses 64 allows continued axial movement of the spindle 8. The shape of the triangular shaped recesses 64 thus forces the pin 16 to rotate in the short end of the L-shaped aperture 78. The shuttle 14 being connected to the pin 16, and the rotation collar 18 being engaged with the shuttle 14, rotate with the pin 16. As the rotation collar 18 rotates the jaws 24 rotate as well. At this point the jaws 24 have not begun to expand.

FIG. 5 shows the jaws 24 in a partially expanded state. At this point the spindle 8 has been moved further towards the jaws 24, further compressing the spring 10. As the spindle 8 moves closer to the jaws 24, the L-shaped aperture 78 moves in relation to the pin 16 such that the pin 16 moves along the long portion of the L-shaped aperture 78, the buffer 6 thus being closer to the pin 16. As the spindle 8 moves towards the jaws 24, the wedge 22 moves towards the jaws 24. The wedge 22 then pushes the jaws 24 radially outward, expanding the jaws 24. The spindle 8 and wedge 22 will continue to move as the cam 4 rotates. When the cam 4 reaches a point in its rotation, the buffer 6, spindle 8, and wedge 22 no longer move towards the jaws 24.

When the cam 4 has reached the fully expanded position of the jaws 24, the cam 4 continues to rotate and the buffer 6, spindle 8, and wedge 22 move away from the jaws 24 due to the force of the spring 10 on the base of the spindle 8. If used, the spring 90 disposed between the rotation collar 18 and the shuttle 14, forces the rotation collar 18 and the shuttle 14 to separate. The pin 16 engages the recess in the sleeve 12 thus forcing the pin 16 and the shuttle 14 to rotate back to the home position. As the shuttle 14 is no longer engaged with the rotation collar 18, the rotation collar 18 and the jaws 24 do not rotate back to their original position. The biasing member 88 forces the jaws 24 to move radially inward to return to the home position.

In operation, the spindle 8 begins in a first position illustrated in FIG. 2. In this position, the shuttle 14 is not engaged with the rotation collar 18 and the pin 16 is in a home position 100 in the triangular opening 64 of the sleeve 12 as illustrated in FIG. 9. The pin 16 is also in the short portion of the L-shaped opening 78 as illustrated in FIG. 2. As the spindle 8 moves to the right (in FIG. 2), the spindle 8 reaches a second position illustrated in FIG. 3. During this movement, the pin 16 remains in the small portion of the L-shaped opening 78 such that the pin 16 and the shuttle 14 move with the spindle 8 until the shuttle 14 engages the rotation collar 18. As the pin 16 moves, it moves from the home position 100 in the triangular opening 64 to an engaged position 105 within the triangular opening 64 (see FIG. 3 and FIG. 9). At this point, the wedge 22 has not yet engaged the jaws 24. Further movement of the spindle 8 forces the pin 16 to move from the small portion of the L-shaped opening 78 to the large portion of the L-shaped opening 78 as the shuttle 14 and pin 8 cannot move further toward the rotation collar 18 once the shuttle 14 and rotation collar 18 are engaged. Movement of the pin 8 in the L-shaped opening 78 forces the pin 8 to move to a rotated position 110 within the triangular opening 64 of the sleeve 12. This movement of the pin 8 causes a rotation of the shuttle 14, the rotational collar 18, and the jaws 24 prior to the wedge 22 forcing the jaws 24 outward. Additional movement of the spindle 8 toward the rotation collar 18 produces expansion of the jaws 24 with no additional rotation.

Once the expansion stroke is complete, the spindle begins to retract. As the spindle 8 retracts, the large portion of the L-shaped opening 78 moves along the pin 16 until the pin 16 reaches the end of the L-shaped opening 78. At this point, the shuttle 14 is pulled out of engagement with the rotation collar 18. The pin 16 then moves along the angled surface 115 of the triangular opening 64 to return the pin 16 to the home position 100 and to return the shuttle 14 to the non-rotated position.

The expanding tool 3 is configured so that it rotates a set amount each time, the set amount being the amount of rotation needed to move the jaws 24 from a tube mouth portion that is stretched to a tube mouth portion that is unstretched. More specifically, the rotation of the jaws 24 is at least partially determined by the number of jaws 24 and is selected to allow for multiple rotations without repeating the position of the jaws 24. For example, in one construction six jaws 24 are employed with each jaw 24 covering an arc length of 60 degrees. The tool is configured to rotate the jaws 24 25 degrees with each rotation such that twelve rotations are required before a jaw position is repeated.

Thus, the invention provides, among other things, a polymer tubing expander tool including an auto-rotate function. Various features and advantages of the invention are set forth in the following claims.

We claim:

1. A tool operable to expand an end of a pipe, the tool comprising:
    a plurality of jaws movable between a closed position and an expanded position and rotatable about a longitudinal axis;
    a rotation collar rotationally coupled to each of the plurality of jaws;
    a shuttle, selectively engageable with the rotation collar and rotatable between a first orientation and a second orientation; and
    a spindle movable between a first position in which the shuttle is in the first orientation and is disengaged from the rotation collar, a second position in which the shuttle is in the first orientation and is engaged with the rotation collar, and a third position in which the shuttle and the rotation collar are rotated together to the second orientation, the rotation of the rotation collar producing a corresponding rotation of the plurality of jaws while the plurality of jaws is in the closed position, wherein movement of the spindle to a fourth position moves the plurality of jaws to the expanded position and maintains the engagement of the shuttle and the rotation collar in the second orientation.

2. The tool of claim 1, wherein one of the rotation collar and the plurality of jaws includes an extension and the other of the rotation collar and the plurality of jaws includes a recess sized to receive the extension, and wherein the extension and the recess cooperate to couple the rotation collar and the plurality of jaws for rotation while allowing the jaws to expand with respect to the rotation collar.

3. The tool of claim 1, wherein the rotation collar includes a first plurality of teeth and the shuttle includes a second plurality of teeth, the second plurality of teeth engageable with the first plurality of teeth to couple the rotation collar and the shuttle for rotation while allowing the shuttle to move freely along the longitudinal axis.

4. The tool of claim 1, further comprising a first biasing member positioned between the shuttle and the spindle and operable to bias the shuttle toward the rotation collar.

5. The tool of claim 1, further comprising a second biasing member positioned between the shuttle and the rotation collar and operable to bias the shuttle away from the rotation collar.

6. The tool of claim 1, wherein the shuttle includes a pin and the spindle includes an L-shaped slot having a short portion that is substantially normal to the longitudinal axis and a long portion that is parallel to the longitudinal axis, and wherein the pin is movably disposed within the L-shaped slot.

7. The tool of claim 6, wherein the pin is disposed within the short portion when the shuttle is between the first position and the second position such that the shuttle and the spindle move along the longitudinal axis in unison between the first position and the second position.

8. The tool of claim 6, wherein the short portion of the L-shaped slot guides the rotation of the shuttle from the first orientation to the second orientation of the shuttle as the spindle moves from the second position to the third position.

9. The tool of claim 6, wherein the pin moves along the long portion of the L-shaped slot to allow the spindle to move between the third position and the fourth position without moving the shuttle.

10. The tool of claim 1, further comprising a sleeve having an aperture that defines a cam surface, the pin disposed within the aperture and selectively engageable with the cam surface such that movement of the spindle from the second position to the first position forces the pin into engagement with the cam surface such that the cam surface forces rotation of the shuttle to the first orientation.

11. The tool of claim 1, further comprising a wedge coupled to the spindle, the wedge engageable with the plurality of jaws to move the jaws between the closed position and the expanded position.

12. A tool operable to expand an end of a pipe, the tool comprising:
 a plurality of jaws movable between a closed position and an expanded position and rotatable about a longitudinal axis;
 a shuttle, selectively engageable with the plurality of jaws and rotatable between a first orientation and a second orientation;
 a spindle selectively coupled to the shuttle such that the spindle and the shuttle move between a first position and a second position in unison, wherein the shuttle is in the first orientation and is disengaged from the plurality of jaws when the spindle is in the first position and the shuttle is in the first orientation and is engaged with the plurality of jaws when the spindle is in the second position, and wherein further movement of the spindle from the second position toward a third position in which the spindle engages the plurality of jaws to move the jaws to an expanded position produces rotation of the shuttle to the second orientation;
 a sleeve coupled to the shuttle and including a cam surface, the cam surface engagable with the shuttle as the spindle moves from the second position to the first position to rotate the shuttle to the first orientation; and
 a first biasing member positioned between the shuttle and the spindle and operable to bias the shuttle toward the plurality of jaws.

13. The tool of claim 12, further comprising a second biasing member positioned between the shuttle and the plurality of jaws and operable to bias the shuttle away from the plurality of jaws.

14. A tool operable to expand an end of a pipe, the tool comprising:
 a plurality of jaws movable between a closed position and an expanded position and rotatable about a longitudinal axis;
 a shuttle, selectively engageable with the plurality of jaws and rotatable between a first orientation and a second orientation;
 a spindle selectively coupled to the shuttle such that the spindle and the shuttle move between a first position and a second position in unison, wherein the shuttle is in the first orientation and is disengaged from the plurality of jaws when the spindle is in the first position and the shuttle is in the first orientation and is engaged with the plurality of jaws when the spindle is in the second position, and wherein further movement of the spindle from the second position toward a third position in which the spindle engages the plurality of jaws to move the jaws to an expanded position produces rotation of the shuttle to the second orientation;
 a sleeve coupled to the shuttle and including a cam surface, the cam surface engagable with the shuttle as the spindle moves from the second position to the first position to rotate the shuttle to the first orientation; and
 a rotation collar disposed between the shuttle and the plurality of jaws, wherein the rotation collar is coupled to the plurality of jaws and is selectively engageable with the shuttle.

15. The tool of claim 14, wherein one of the rotation collar and the plurality of jaws includes an extension and the other of the rotation collar and the plurality of jaws includes a recess sized to receive the extension, and wherein the extension and the recess cooperate to couple the rotation collar and the plurality of jaws for rotation while allowing the jaws to expand with respect to the rotation collar.

16. The tool of claim 14, wherein the rotation collar includes a first plurality of teeth and the shuttle includes a second plurality of teeth, the second plurality of teeth engageable with the first plurality of teeth to couple the rotation collar and the shuttle for rotation while allowing the shuttle to move freely along the longitudinal axis.

17. A tool operable to expand an end of a pipe, the tool comprising:
 a plurality of jaws movable between a closed position and an expanded position and rotatable about a longitudinal axis;
 a shuttle, selectively engageable with the plurality of jaws and rotatable between a first orientation and a second orientation;
 a spindle selectively coupled to the shuttle such that the spindle and the shuttle move between a first position and a second position in unison, wherein the shuttle is in the first orientation and is disengaged from the plurality of jaws when the spindle is in the first position and the shuttle is in the first orientation and is engaged with the plurality of jaws when the spindle is in the second position, and wherein further movement of the spindle from the second position toward a third position in which the spindle engages the plurality of jaws to move the jaws to an expanded position produces rotation of the shuttle to the second orientation;

a sleeve coupled to the shuttle and including a cam surface, the cam surface engagable with the shuttle as the spindle moves from the second position to the first position to rotate the shuttle to the first orientation, wherein the shuttle includes a pin and the spindle includes an L-shaped slot having a short portion that is substantially normal to the longitudinal axis and a long portion that is parallel to the longitudinal axis, and wherein the pin is movably disposed within the L-shaped slot.

18. The tool of claim 17, wherein the pin is disposed within the short portion when the shuttle is between the first position and the second position such that the shuttle and the spindle move along the longitudinal axis in unison between the first position and the second position.

19. The tool of claim 17, wherein the short portion of the L-shaped slot guides the rotation of the shuttle from the first orientation to the second orientation of the shuttle as the spindle moves from the second position to the third position.

20. The tool of claim 17, wherein the pin moves along the long portion of the L-shaped slot to allow the spindle to move between the third position and the fourth position without moving the shuttle.

21. The tool of claim 17, wherein the sleeve includes an aperture that defines the cam surface, the pin disposed within the aperture and selectively engageable with the cam surface such that movement of the spindle from the second position to the first position forces the pin into engagement with the cam surface to rotate the shuttle from the second orientation to the first orientation.

22. A tool operable to expand an end of a pipe, the tool comprising:
   a plurality of jaws movable between a closed position and an expanded position and rotatable about a longitudinal axis;
   a shuttle, selectively engageable with the plurality of jaws and rotatable between a first orientation and a second orientation;
   a spindle selectively coupled to the shuttle such that the spindle and the shuttle move between a first position and a second position in unison, wherein the shuttle is in the first orientation and is disengaged from the plurality of jaws when the spindle is in the first position and the shuttle is in the first orientation and is engaged with the plurality of jaws when the spindle is in the second position, and wherein further movement of the spindle from the second position toward a third position in which the spindle engages the plurality of jaws to move the jaws to an expanded position produces rotation of the shuttle to the second orientation;
   a sleeve coupled to the shuttle and including a cam surface, the cam surface engagable with the shuttle as the spindle moves from the second position to the first position to rotate the shuttle to the first orientation; and
   a wedge coupled to the spindle, the wedge engageable with the plurality of jaws to move the jaws between the closed position and the expanded position.

23. A method of rotating a plurality of jaws, the plurality of jaws being movable between a closed position and an expanded position, the method comprising:
   positioning a spindle in a first position wherein the spindle is spaced apart from the plurality of jaws and the plurality of jaws are in the closed position;
   coupling a shuttle to the spindle, the shuttle movable between a first orientation and a second orientation;
   moving the spindle and the shuttle in unison along a longitudinal axis to a second position;
   coupling the shuttle and the plurality of jaws when the spindle is in the second position;
   moving the spindle to a third position in which the spindle is spaced apart from the plurality of jaws and the plurality of jaws are in the closed position;
   rotating the spindle and the plurality of jaws to the second orientation in response to movement of the spindle from the second position to the third position;
   moving the spindle to a fourth position while maintaining the spindle and the plurality of jaws in the second orientation;
   moving the jaws to the expanded position in response to movement of the spindle to the fourth position;
   returning the spindle to the first position from the fourth position;
   disengaging the shuttle and the plurality of jaws as the spindle moves from the second position toward the first position;
   engaging the shuttle and a cam surface after the shuttle disengages from the plurality of jaws; and
   rotating the shuttle from the second orientation to the first orientation in response to the cooperation of movement of the spindle to the first position and the engagement of the shuttle and the cam surface.

* * * * *